Oct. 5, 1948.　　A. L. KRONQUEST　　2,450,669
APPARATUS FOR DEOXIDIZING
METAL SHEET EDGE PORTIONS

Filed Aug. 18, 1942　　6 Sheets-Sheet 2

Inventor
Alfred L. Kronquest

By Mason, Porter & Diller
Attorneys

Patented Oct. 5, 1948

2,450,669

UNITED STATES PATENT OFFICE 2,450,669

APPARATUS FOR DEOXIDIZING METAL SHEET EDGE PORTIONS

Alfred L. Kronquest, Syracuse, N. Y., assignor to Continental Can Company, Inc., New York, N. Y., a corporation of New York Application August 18, 1942, Serial No. 455,240

7 Claims. (Cl. 134—64)

The invention relates generally to the art of manufacturing metallic receptacles and primarily seeks to provide noval apparatus for deoxidizing sheet or can body blank edge portions which are to be brought into contact in the formation of can body side seams, thereby to facilitate efficient solder bonding of the side seams.

It has been found difficult and commercially impractical heretofore to make can bodies including solder bonded side seams from mild steel or black plate blanks. Perhaps the principal difficulty has been experienced because of the inability efficiently to solder black plate. It is well known that in order to solder black plate, the portions thereof to be soldered must be cleansed of oxidation and scale, for without such cleansing the solder will not properly adhere to the metal. Moreover, the soldering must be performed immediately after the surface cleansing because reoxidation takes place rapidly. Various methods have been tried in efforts to solve this problem, among them being that of applying protective coatings to previously cleansed portions of the plate, said coatings having the quality of facilitating, or at least not interfering with efficient soldering, and being intended to protect the cleansed surfaces against oxidation and scale accumulation prior to soldering. Such methods have considerable merit in that they permit temporary storage of the treated sheets or blanks before soldering, but all such methods of which I am aware have presented accompanying disadvantages because of the time and labor necessarily consumed in performance of the several method steps, or the complicated and space consuming nature of the apparatus necessary to be used in performance of said method steps.

It is an object of the invention to provide an apparatus for deoxidizing metal sheet edge portions which is so simple, compact and efficient in operation that it can be directly incorporated in standard body makers. It is to be understood, however, that while the invention is primarily designed for incorporation and practice directly in standard can body makers, it is not limited in scope to use directly in body makers but also comprehends uses apart from body makers and by which blanks or sheets can be prepared for efficient soldering.

It is also to be understood that while the invention is primarily designed for deoxidizing black plate sheets or body blanks, it is in no sense limited to operation upon black plate alone but can be employed with equal facility on other metallic plates whereon oxidation takes place, such as bonderized plates. Whatever the type of plate, when the invention is practiced in a standard body maker it will be customary, but not necessary, to operate upon blanks which have the usual protective coating thereon of lacquer or enamel or both, leaving bare only those marginal or edge portions which are to engage in the formation of the can body side seams.

An object of the invention is to provide apparatus of the character stated including means for feeding the sheets or body blanks, means for forming a chamber about edge portions of the travelling sheets or blanks which are to be engaged in seam structures and solder bonded, and means for directing a deoxidizing gas into said chamber.

Another object of the invention is to provide an apparatus of the character stated in which means also is provided for drawing air into and air and gas from said chamber thereby to prevent passage of the gas into the surrounding atmosphere.

Another object of the invention is to provide an apparatus of the character stated in which means also is included for automatically discontinuing the introduction of gas into the deoxidizing chamber whenever the drawing of air into the chamber shall fail.

Another object of the invention is to provide an apparatus of the character stated in which the gas employed in deoxidizing the metallic surfaces is hydrogen chloride gas and is formed by passing air through concentrated hydrochloric acid.

Another object of the invention is to provide a gas generating equipment of the character stated in which the air is forced under pressure into the concentrated hydrochloric acid in widely dispersed form through a porous walled element immersed in the acid.

Another object of the invention is to provide in an apparatus of the character stated means for wetting the can body blank edges before they pass into the deoxidizing chamber.

Another object of the invention is to provide in an apparatus of the character stated means for generating the deoxidizing gas by heating a concentrated hydrochloric acid and water mixture thereby to form a gas in the nature of a moist vapor and render unnecessary the step of first wetting the can body blank edges before they pass into the deoxidizing chamber.

Another object of the invention is to include in an apparatus of the character stated a pump for drawing the air and gas from the deoxidizing chamber and for passing the air through the gas generating hydrochloric acid.

Another object of the invention is to include in an apparatus of the character stated a vessel containing water into which gas and air drawn from the deoxidizing chamber is directed by the pump, the water serving to absorb hydrogen chloride and reform hydrochloric acid of commercial value rather than permit the gas to pass freely into the atmosphere.

Another object of the invention is to provide in an apparatus of the character stated a novel form of deoxidizing manifold designed to provide an inner gas chamber surrounded in part at least by an air chamber, a slotway through which the can body blanks can pass while projecting through a portion of the air chamber and into the gas chamber, and means in the gas chamber for guiding the blanks and limiting the distance of projecting thereof into the gas chamber.

With the above and other objects in view that will herinafter appear, the nature of the invention will be more fully understood by following the detailed description, the appended claims and the several views illustrated in the accompanying drawings.

Although not so limited in scope, the invention is particularly designed for incorporation directly in a standard form of can body maker. An example of standard body maker is the well-known Troyer-Fox machine, a disclosure of which may be found in U. S. Letters Patent 1,772,820 issued to Troyer on August 12, 1900. In body makers of this type, body blanks are drawn one-by-one from a supply stack at the supply station and are then fed step-by-step through an idle station, a grain breaking station at which the blanks are fed laterally off the feed line, are curled so as to break the grain and facilitate subsequent shaping of the can bodies, and then returned to the feed line in which they are advanced step-by-step through an idle station, a slitting and notching station, then through folding stations at which hooks are formed at the lateral edges of the blanks intended to subsequently engage in the formation of side seams, and then through a fluxing station to the shaping or forming station at which the can bodies are formed. The formed can bodies then pass on to the solder bonding station at which the side seams are solder bonded. When the improved apparatus herein disclosed is incorporated directly in a body maker instead of as a deoxidizing unit separate and apart from body making apparatus, it is installed directly after the grain breaking station and in advance of the notching station and the stations succeeding the same. This position of installation is clearly illustrated in Figures 1 and 8 of the drawings, and the complete sequence of the body forming steps, from the initial feeding of the can body blanks to the completion of the can bodies by the solder bonding step, is diagrammatically illustrated in Figures 9 and 9A.

In the form of the invention illustrated in Figures 1 through 6, 5 designates body maker framing structure, 6 the grain breaking station of the body maker, and 7 the notching station thereof. As previously stated, the can body blank deoxidizing apparatus is installed between the stations 6 and 7 in the manner clearly illustrated in Figures 1 and 2 of the drawings.

Figure 2:
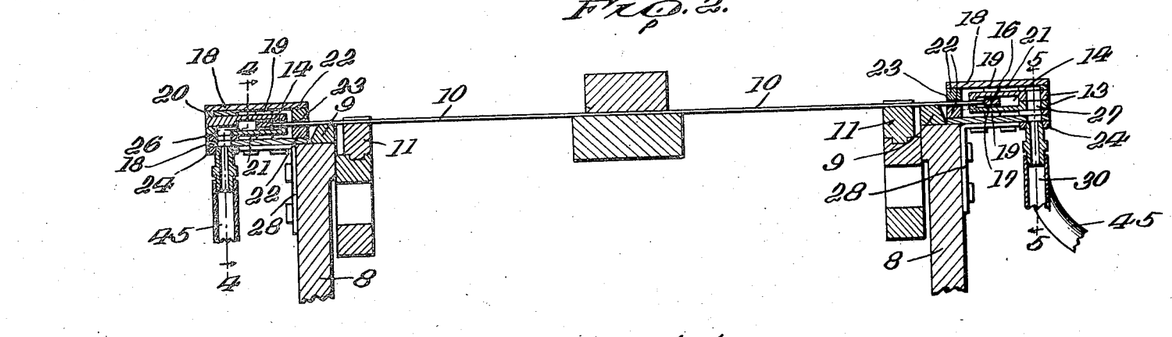
Figure 2 is a fragmentary vertical cross section taken across the can body blank feedway of a conventional form of body maker having improved deoxidizing manifold structures mounted thereon, the section through the manifold at the right-hand side of the feedway being taken through the suction connection, and that at the left-hand side of the feedway through the deoxidizing gas delivery duct.
Figure 3:
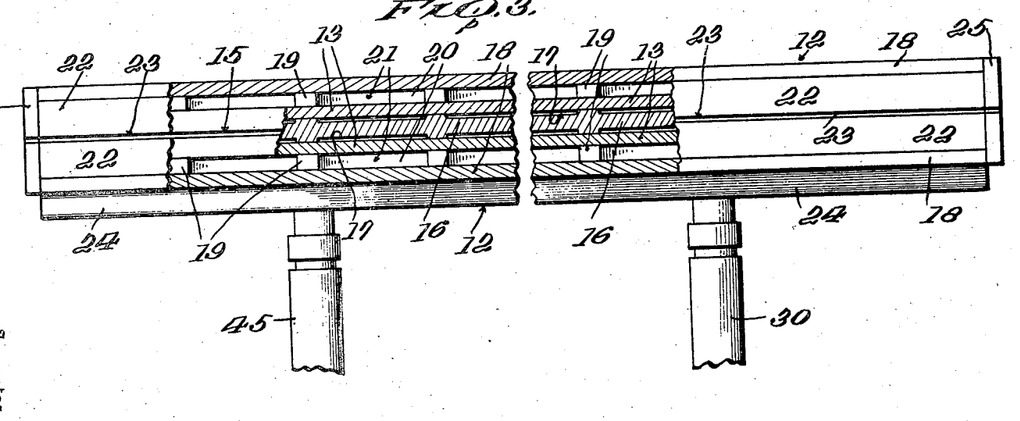
Figure 3 is an edge view of one of the deoxidiing manifolds looking in the direction of the can body blank edge passing slotway therein, parts being broken away and shown in longitudinal section.

In this installation, side housings or frame extensions 8 are interposed between the grain breaking and notching stations 6 and 7 and provide for the support of extensions 9 of the regular can body blank feedways in the standard body maker structure. The can body blanks 10 are fed over these feedways by the usual reciprocating feed bars 11. In the practical development of the invention two identical deoxidizing manifolds generally designated 12 are mounted in cooperative relation to the feedways, one at the right-hand side and one at the left as indicated in Figure 2. These manifolds are so formed that the marginal edge portions of the travelling can body blanks project therethrough and are deoxidized so that when these edge portions are subsequently brought into engagement in the formation of side seams they can be efficiently solder bonded without interference by the oxidation and scale which existed thereon prior to the deoxidation in the passage through the manifolds 12.

Each manifold includes two flat bars 13 laid face upon face and having their opposed faces recessed so as to form between them a gas chamber 14. The inwardly positioned opposed portions of the bars are shaped to form a slotway 14 therebetween in the manner clearly illustrated in Figures 2 and 3 of the drawings, the slotway being only slightly wider than the thickness of the can body blanks which are designed to pass therethrough. A spacer bar 16 serves as a spacer for the opposed bars 13 within the gas chamber 14, and each bar 16 is recessed as at 17 to form gas passages and thereby avoid dividing the gas chamber into two separate chambers. This bar 16 also serves as an edge guide for the can body blanks 10, and definitely limits the distance to which the marginal edges of the can body blanks project into the respective gas chamber in the manner clearly illustrated in Figure 2. The recessed bars 13 form a sort of inner shell surrounding the gas chamber 14.

The inner shell of each manifold is surrounded by an outer shell composed of upper and lower plates 18 which are held in spaced relation above and below the inner shell bars 13 by intermediate spacers 19 and by longitudinal edge plates 20 disposed along the outer edge of the respective manifold in the manner clearly illustrated in Figure 2. The spacing of the plates 18 with relation to the bars 13 provides an air chamber 21 partially surrounding the inner shell and gas chamber, each such air chamber being defined inwardly by closure bars 22 extending longitudinally in opposed relation at the inner edge of the respective manifold and having their opposed faces spaced apart to provide a slotway 23 aligning and corresponding in function with the slotway 15 hereinbefore referred to. See Figures 2 and 3. The slotways 15 and 23 extend through the ends of the manifold so that the can body blanks can pass freely through the manifolds to have the marginal edge portions thereof deoxidized in the manifolds and then pass on through the various other stations of the body maker.

A bottom bar 24 is secured along the outer edge of each manifold 12, and slotted end closure plates 25 are provided for closing the ends of the gas and air chambers 14 and 21.

Figure 4:
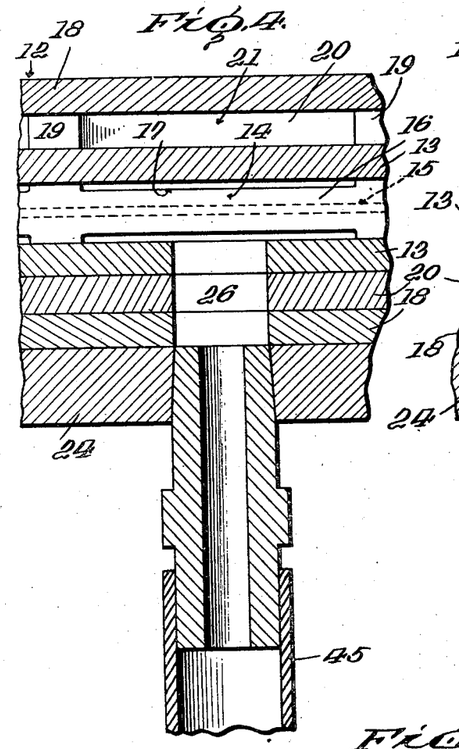
Figure 4 is an enlarged fragmentary vertical longitudinal section taken on the line 4—4 on Figure 2.
Figure 5:
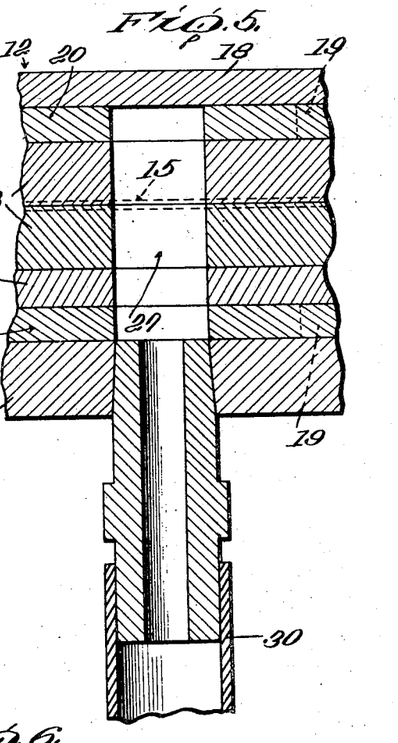
Figure 5 is an enlarged fragmentary vertical longitudinal section taken on the line 5—5 on Figure 2.
Figure 6:
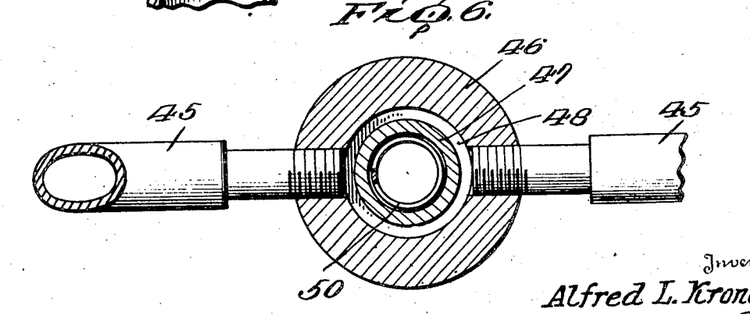
Figure 6 is an enlarged horizontal section taken on the line 6—6 on Figure 1.

It will be observed by reference to Figures 2, 4, and 5 of the drawings that each manifold is provided with an opening 26 extending through the bottom bar 24, the lower plate 18 and one bar 13 and providing a gas port 26 leading into the gas chamber 14. See Figure 4 and the left-hand side of Figure 2. Each manifold also has an opening extending through the bottom bar 24, the lower plate 18, both plates 20 and both bars 13, and forming a suction port 27 as clearly illustrated in Figure 5 and at the right-hand side of Figure 2. Each manifold is suitably supported upon the side housing or frame portion 8 as by a bracket 28. See Figures 1 and 2.

A pump 29 is provided and has its intake connected by a suction duct 30 with the suction port 27, a gauge 31 being connected in this duct so as to visually indicate the amount of suction or vacuum being drawn in the air chamber 21. A cut-off valve 32 may be interposed in the duct 30 if desired. The outlet of the pump is connected with a pressure pipe 33 having an adjustable choke valve 34 connected therein, a depending leg being connected in the pressure pipe 33 in advance of the valve 34 and leading into a collecting sump 35 in which bits of solid matter and condensation may be collected.

The outlet from the valve is connected by a duct 36 with a vessel 37 having water 38 therein. The vessel is closed by a rubber stopper 39 and an outlet to atmosphere also is supported in the stopper as indicated at 40. The duct 36 connects with a tube 41 depending in the vessel 37 and which supports a porous walled hollow element 42 immersed in the water 38. The purpose of the valve 34 and the vessel 37 and its contained parts will presently be described.

Figure 1:
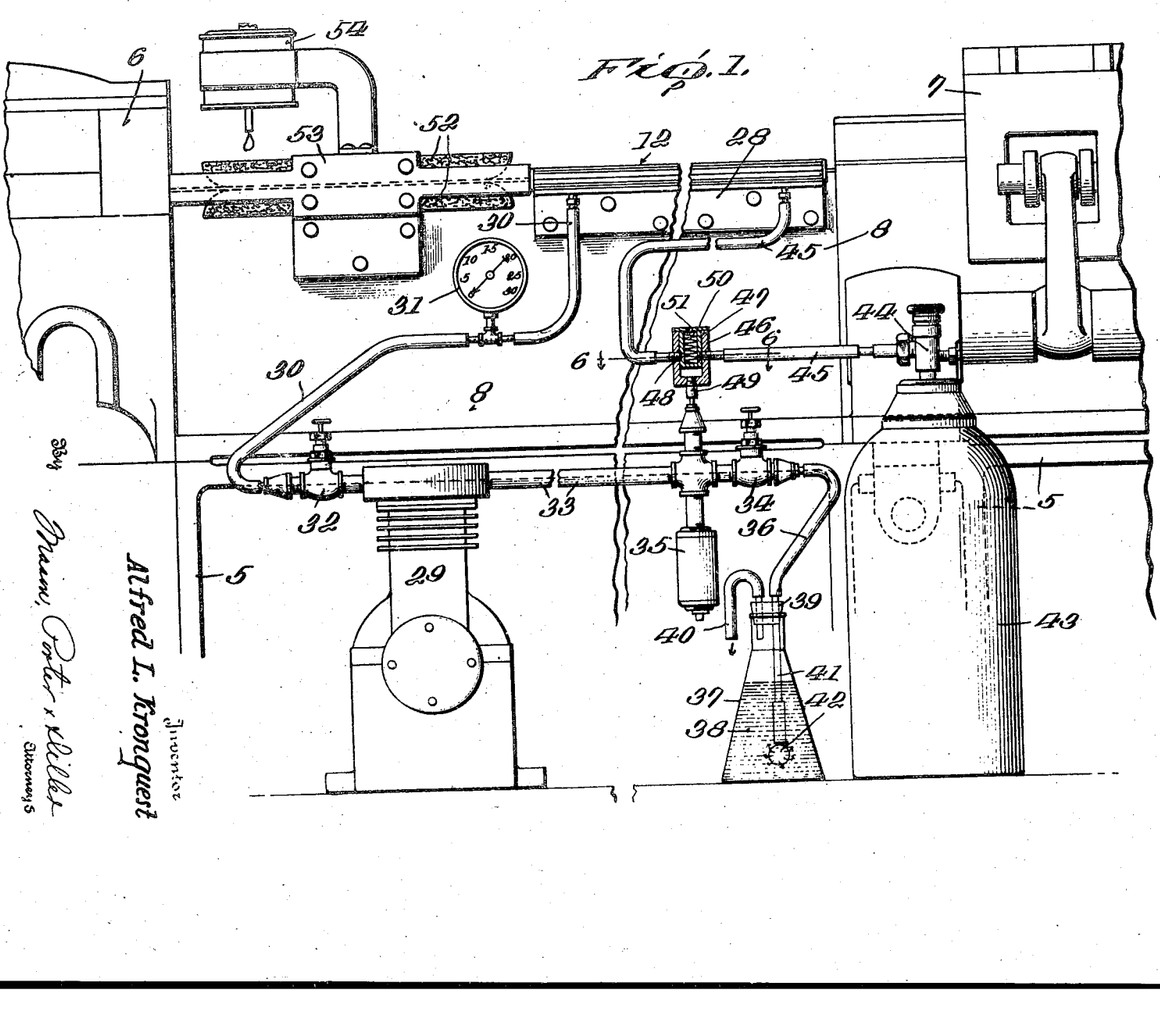
Figure 1 is a fragmentary side elevation illustrating the invention applied to a conventional form of can body maker, parts being broken away and in section.

A tank 43 of compressed hydrogen chloride gas is provided in this form of the apparatus and the deoxidizing gas delivers from this tank through a suitable reducing valve 44 into a gas duct 45 connected with the gas port 26 in the manner clearly illustrated in Figures 1 and 2 of the drawings. The duct 45 has a valve casing 46 spliced therein, and within the casing there is mounted a valve plunger 47 having an annular recess 48 which is normally disposed to permit gas flow through the duct to the gas chamber 14 in the manifold in the manner illustrated in Figures 1 and 6 of the drawings. In order to normally hold the valve plunger in the position stated there is provided another vertical leg 49 extending from the pressure pipe 33 and connecting in the casing 46 beneath the plunger valve. The pressure thus directed into the lower part of the casing 46 beneath the plunger valve serves to hold the valve in the open position illustrated in Figure 1 against the action of the compression spring 50 which constantly tends to move the plunger downwardly and close off the passage of gas through the duct 45. An air port 51 is provided in the top of the casing 46 so as to permit free upward movement of the plunger. It will be obvious that deoxidizing hydrogen chloride gas will be supplied through the duct 45 to the manifold gas chamber 14 so long as the pump 29 continues to operate. Whenever the pump 29 ceases to operate, thereby causing a failure of the suction or evacuation of the air chamber 21, the pump will no longer supply pressure beneath the valve plunger 47 and the plunger will be moved downwardly by the spring 50 and discontinue the delivery of deoxidizing gas to the manifold gas chamber.

In passing toward the manifolds 12, the marginal edge portions of the can body blanks 10 which are to be deoxidized in the manifolds pass between and are wetted by upper and lower swab sets 52 which are supported as at 53 on the framing 8 and are supplied with wetting fluid from drip reservoirs 54 as indicated in Figure 1. Any suitable wetting fluid can be employed, as for example water plus .1 per cent wetting agent such as sulphonated fatty alcohol.

In the operation of the apparatus constructed and installed as illustrated in Figures 1 through 6 the can body blanks are fed over the feedways 9 by the feeding devices 11 and the lateral marginal edge portions thereof pass between the wetting swabs 52 and are thoroughly wetted thereby. Immediately after being wetted by the swabs 52 the marginal edge portions of the travelling blanks pass into the manifolds 12 through the slotways 15 and 23 provided therein, being edge guided by the abutment bars 16. While passing through the gas chambers 14 the marginal edge portions of the body blanks will be treated by the gas in the chamber delivered by the duct 45 and will have all oxidation and scale removed therefrom. The constant drawing of air into the air spaces 21 through the slotways 23 and the drawing away of gas through the slotways 15 and air and gas from the air chambers 21 through the ducts 30 serves to prevent any of the hydrogen chloride gas from passing out into the atmosphere surrounding the manifolds 12. As previously stated, so long as the pumps 29 continue to operate and evacuate the chambers 21 and supply pressure in the vertical leg 49 the introduction of hydrogen chloride gas into the gas chamber 14 will continue, but whenever the pump ceases to operate the valve 46, 47 will act automatically to close off this introduction of gas and thereby assure against delivery of gas through the slotways 15 and 23 into the atmosphere surrounding the manifolds 12.

The choke valve 34 is adjusted so as to restrict the passage of air and gas through the pressure line 33 and 36 into the vessel 37 and assure the provision of a proper amount of pressure in the vertical leg 49 and below the valve plunger 47. The excess gas and air mixture passing through the valve 34 and the duct 36 into the vessel 37 passes in widely dispersed form through the porous walled hollow element 42 into the water 38. The purpose of bubbling this gas and air mixture through the water 38 is to prevent free passage of the gas into the surrounding atmosphere and also to reclaim the gas. Hydrogen chloride is absorbed by the water and reforms into hydrochloric acid of commercial value. It has been found that the wetting of the marginal edge portions of the can body blanks before passing them into the deoxidizing manifolds 12 tremendously accelerates the action of the deoxidizing gas upon the metal and brings about the desired deoxidation almost instantly.

It is to be understood that after the can body blank marginal edge portions have been cleansed, that is rendered devoid of oxidation and scale, in the manner hereinbefore described, the blanks pass rapidly through the notching, hook forming, body shaping and seam forming and the solder bonding stations, thus completing the can bodies by the solder bonding step before any oxidation of the can body blank portions which were cleansed in the manifolds 12 can take place. As before stated, while it is preferred that the invention be practiced directly in the body maker as aforesaid, it is to be understood that the apparatus can be employed separate and apart from the body maker and the deoxidizing step followed by any approved method of protecting the deoxidized can body blank edge portions against reoxidation so that the blanks can be stored temporarily before the can bodies are actually made up therefrom.

Figure 7:
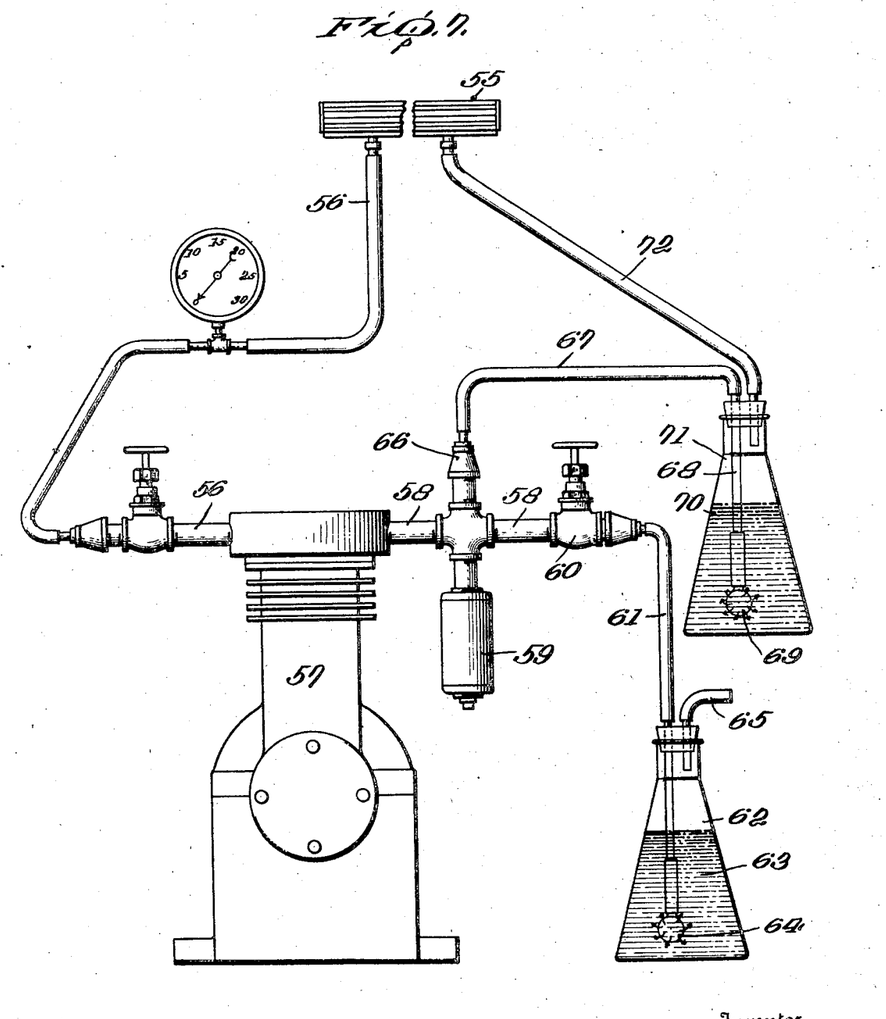
Figure 7 is a somewhat diagrammatic side elevation illustrating another form of the invention in which the deoxidizing gas is formed by passing air through concentrated hydrochloric acid.

In Figure 7 there is illustrated another form of the invention and it is to be understood that the apparatus illustrated in this figure can be installed in the body maker in the manner illustrated in Figure 1 or employed apart from the body maker structure as desired. In this form of the apparatus a manifold structure generally designated 55 and constructed in the manner illustrated in Figures 1 through 5 of the drawings is employed. This manifold is connected by a suction duct 56 with the inlet to the pump 57, and the outlet of the pump is connected with a pressure line 58 including a sump connection 59 as and for the purposes previously described. The pressure line communicates through a choke valve 60 and a duct 61 with a gas reclaiming vessel 62 having water therein, as indicated at 63, and a porous walled hollow element 64 immersed in the water and through which the air and gas mixture delivered from the outlet pipe 58 are dispersed. In this form also the escape of hydrogen chloride to the atmosphere through the outlet 65 is prevented, the hydrogen chloride being absorbed by the water and reformed thereby into hydrochloric acid of commercial value.

In this form of the invention a novel manner of generating hydrogen chloride gas is employed. The constriction provided by the adjustable choke valve 60 causes air under pressure to flow from the pressure pipe 58 through the vertical leg 66 into a duct 67 which delivers through a tube 68 and in widely dispersed form through the porous walled hollow element supported by the tube into concentrated hydrochloric acid 70 in a vessel 71.

The element 69 is immersed in the acid in the manner illustrated in Figure 7. The passing of the air through the concentrated hydrochloric acid forms hydrogen chloride gas by picking up hydrogen chloride which is an active deoxidizing agent. The hydrogen chloride gas passes upwardly from the vessel 71 and through the gas duct 72 into the gas chamber of the manifold 55.

Except for the difference in the form of the gas source, that is, the generation of gas by passing the air through the concentrated hydrochloric acid, the apparatus disclosed in Figure 7 will operate in the same manner as the apparatus hereinbefore described in connection with Figures 1 through 6. The dispersion of the air in the concentrated hydrochloric acid 70 through porous element 69 causes finely divided bubbles to pass up through the hydrochloric acid, said bubbles taking up hydrogen chloride into the head space in the vessel, and the hydrogen chloride gas being delivered through the duct 72 for the can body blank deoxidizing purposes previously described. It will be understood, of course, that after the apparatus has been operated for a while, a mixture of air and gas will pass through the duct 67 and tube 68 into the vessel 71, the air being drawn through the outside slot in the manifold and the gas being drawn through the same duct 56 from the gas chamber. It will also be understood that in this form of the invention, as in the form of the invention previously described, a manifold 55 will be mounted at each side of the feedways over which the can bodies are fed, whether they be in a body maker structure or in a structure separate from the body maker.

As another alternative adaptation of the invention, the duct 67 can be dispensed with and the hydrogen chloride gas generated solely by suction through the duct 56, the air and gas chambers and the duct 72, sufficient air being drawn in by suction through the tube 68 to provide for the desired generation of the gas.

Figure 8:
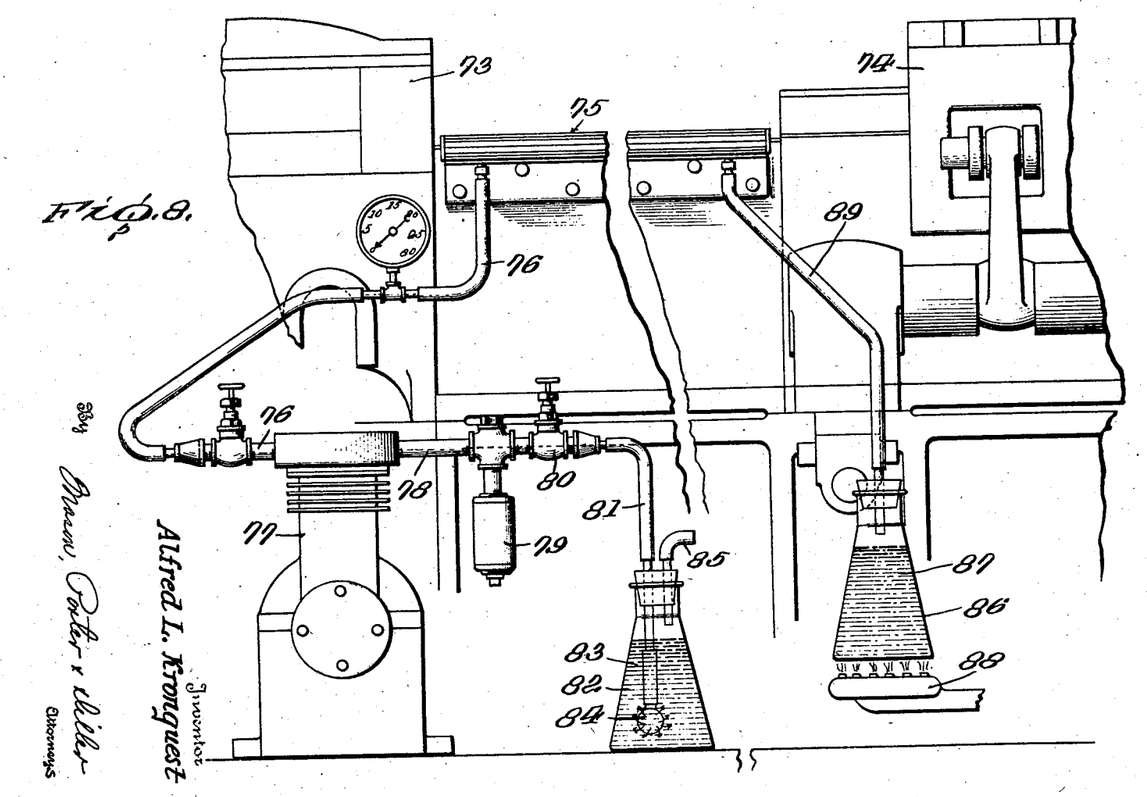
Figure 8 is a view similar to Figure 1 and illustrates another form of the invention in which the deoxidizing gas is formed by heating a concentrated hydrochloric acid and water mixture and in which no means for wetting the can body blank edge portions is necessary.
Figures 9, 9A:
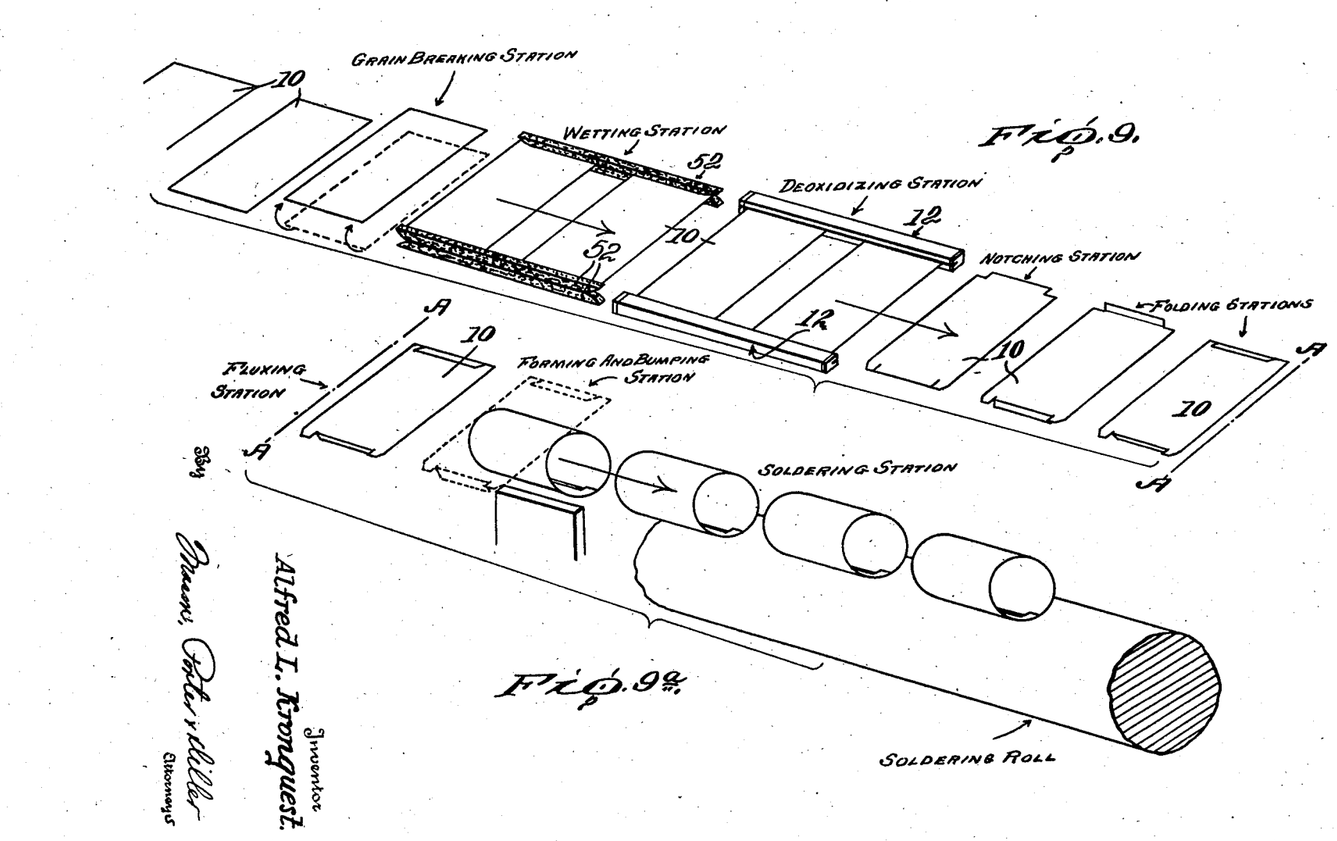
Figures 9 and 9A when joined at the line A—A together comprise a diagrammatic view illustrating the succession of steps which result in the complete process of deoxidizing the can body blanks and forming them into can bodies having solder bonded side seams.

In Figure 8 of the drawings there is illustrated another alternative form of apparatus which includes a means for generating the gas which dispenses with the necessity of providing means for wetting the marginal edge portions of the can body blanks before subjecting them to the cleansing or deoxidizing step. In this illustration of the invention the apparatus is shown as embodied directly in a body maker, the grain breaking station being indicated at 73, the notching station at 74, and the deoxidizing station being located between the stations 73 and 74. The deoxidizing manifold equipment is generally designated 75. The manifold is connected by a suction line 76 with the inlet of the pump 77, the outlet of the pump being connected with a pressure line 78 as in the previous disclosures. In this disclosure the pressure line 78 also includes a collecting sump 79 and delivers through a choke valve 80 and a duct 81 into a gas reclaiming vessel 82, wherein is included water as indicated at 83. The duct 81 delivers through a tube and porous walled hollow element 84 into the water, air being permitted to escape from the vessel through the outlet 85, and the gas and air mixture being dispersed through the element 84 immersed in the water so as to permit the water to absorb hydrogen chloride and reclaim the gas in the form of commercial hydrochloric acid, as previously described.

In this form of the invention the novel gas generating means takes the form of a vessel 86 having a hydrochloric acid and water mixture therein as indicated at 87 and being subjected to heat as at 88. The heating of the hydrochloric acid and water mixture results in the generation of a hydrochloric acid vapour and this moist gas is delivered through a gas duct 89 into the gas chamber in the manifold 75. The suction through the duct 76 serves to prevent passage of the deoxidizing gas into the atmosphere surrounding the manifold 75 in the manner previously described, and the formation of the moist gas in the manner just above described and the introduction thereof into the gas chamber of the manifold provides for the desired deoxidation of the can body blank edge portions without the necessity of wetting said edge portions previous to the introduction thereof into the manifold. In this form of the invention as in the form illustrated in Figure 1, a deoxidizing manifold 75 will be mounted at each side of the body maker, and it should be understood in connection with this form of the invention, as in said other form, that separate pump and vessel sets can be provided at both sides of the body maker or single sets may be provided with manifold connections with the individual air and gas ducts 30, 45 or 76, 89 as the case may be. It should be understood that all metal parts which are contacted by the hydrogen chloride gas in the manifold and in the pump should be made of an acid resisting alloy such as Hastelloy, tantalum, or the like.

It is, of course, to be understood that the details of structure and the arrangement of parts may be variously changed and modified without departing from the spirit and scope of the invention.

I claim:

1. In apparatus of the character described metal sheet supporting ways, means for feeding sheets along asid ways, means forming an elongated chamber paralleling said ways at one side and having a longitudinal slot through which sheet edge portions may project into and travel along in and through said chamber to be cleansed therein, means for directing a sheet edge cleansing gas into said chamber, means for drawing air into the chamber through said slot to thereby prevent passage of the gas through said slot into the atmosphere surrounding the chamber forming means, and means automatically operable upon failure of said air drawing means for discontinuing the introduction of gas into said chamber.

2. In apparatus of the character described metal sheet supporting ways, means for feeding sheets along said ways, means forming an elongated chamber paralleling said ways at one side and having a longitudinal slot through which sheet edge portions may project into and travel along in and through said chamber to be cleansed therein, means for directing a sheet edge cleansing gas into said chamber, and means for drawing air into the chamber through said slot to thereby prevent passage of the gas through said slot into the atmosphere surrounding the chamber forming means, said air drawing means including a power driven pump having a suction inlet connected with said chamber and a pressure outlet, said gas directing means including a duct connected with said chamber and having a normally closed pressure opened valve therein having a pressure connection with said pressure outlet whereby said valve will automatically close and stop introduction of gas into said chamber whenever said pump stops and the drawing of air is thereby terminated.

3. In apparatus of the character described metal sheet supporting ways, means for feeding sheets along said ways, means forming an elongated chamber paralleling said ways at one side and having a longitudinal slot through which sheet edge portions may project into and travel along in and through said chamber to be cleansed therein, means for wetting edge portions of the sheets which are to pass through said chamber, and means for directing hydrogen chloride gas into said chamber for deoxidizing sheet edge portions passing therethrough.

4. In apparatus of the character described metal sheet supporting ways, means for feeding sheets along said ways, means forming an elongated chamber paralleling said ways at one side and having a longitudinal slot through which sheet edge portions may project into and travel along in and through said chamber to be cleansed therein, means for directing a sheet edge cleansing gas into said chamber, and means for drawing air into the chamber through said slot to thereby prevent passage of the gas through said slot into the atmosphere surrounding the chamber forming means, said air drawing means including a power driven pump having a suction inlet connected with said chamber and a pressure outlet; and said gas directing means including a vessel containing concentrated hydrochloric acid having a hollow porous walled element immersed therein, a duct connected with the pump outlet and with the hollow element for directing air under pressure therethrough into and through the hydrochloric acid, and a duct connecting with the vessel at a point above the acid therein and with said chamber.

5. In apparatus of the character described metal sheet supporting ways, means for feeding sheets along said ways, means forming an elongated chamber paralleling said ways at one side and having a longitudinal slot through which sheet edge portions may project into and travel along in and through said chamber to be cleansed therein, means for directing a sheet edge cleansing gas into said chamber, and means for drawing air into the chamber through said slot to thereby prevent passage of the gas through said slot into the atmosphere surrounding the chamber forming means, said air drawing means including a power driven pump having a suction inlet connected with said chamber and a pressure outlet; and said gas directing means including a vessel containing concentrated hydrochloric acid having a hollow porous walled element immersed therein, a duct connected with the pump outlet and with the hollow element for directing air under pressure therethrough into and through the hydrochloric acid, and a duct connecting with the vessel at a point above the acid therein and with said chamber; a second vessel having water therein and an opening to atmosphere above the water, a hollow porous walled element immersed in the water, and a duct having a choke valve therein connected with the hollow element and having a common connection with the pump outlet and the other duct connected therewith and serving to direct excess gas and air mixture into the water and thereby cause hydrogen chloride to be absorbed by the water and reform into hydrochloric acid instead of freely passing off into the surrounding atmosphere.

6. In a can body maker, can body blank supporting feedways, means for feeding body blanks over the feedways with marginal edge portions thereof intended to be formed into can body side seams disposed laterally, a blank edge deoxidizing manifold disposed at each side of the feed ways and each comprising an inner shell formed to provide an inner gas chamber and an outer shell formed to partially surround said gas chamber in spaced relation and having a longitudinal slot therein opening through the outer shell and the inner shell into the gas chamber and through which body blanks fed over the feed ways project into and move through said gas chamber, means for directing a deoxidizing gas into each gas chamber, and means for drawing air from outside each manifold through its slot into the space surrounding the respective gas chamber and air and gas from said chamber away from said manifold, thereby to prevent passage of gas through said slot into the atmosphere surrounding the manifold.

7. In a can body maker, can body blank supporting feedways, means for feeding body blanks over the feedways with marginal edge portions thereof intended to be formed into can body side seams disposed laterally, a blank edge deoxidizing manifold disposed at each side of the feedways and each comprising an inner shell formed to provide an inner gas chamber and an outer shell formed to partially surround said gas chamber in spaced relation and having a longitudinal slot therein opening through the outer shell and the inner shell into the gas chamber and through which body blanks fed over the feedways project into and move through said gas chamber, means for directing a deoxidizing gas into each gas chamber, means for drawing air from outside each manifold through its slot into the space surrounding the respective gas chamber and air and gas from said chamber away from said manifold, thereby to prevent passage of gas through said slot into the atmosphere surrounding the manifold, and means in each gas chamber for engaging the travelling body blanks and determining the extent of projection of the edge portions thereof into said gas chambers.

ALFRED L. KRONQUEST.

REFERENCES CITED

The following references are of record in the file of this patent:

UNITED STATES PATENTS

| Number | Name | Date |
| --- | --- | --- |
| 888,202 | Stickler | May 19, 1908 |
| 1,392,781 | Marsh | Oct. 4, 1921 |
| 1,859,734 | George | May 24, 1932 |
| 1,907,875 | Robertson | May 9, 1933 |
| 1,934,357 | Kronquest | Nov. 7, 1933 |
| 2,040,164 | Anderson | May 12, 1936 |
| 2,043,300 | McDorman | June 9, 1936 |
| 2,119,261 | Andrews | May 31, 1938 |
| 2,194,565 | Moss | Mar. 26, 1940 |
| 2,199,418 | Redmond et al. | May 7, 1940 |
| 2,225,778 | Hallman | Dec. 24, 1940 |
| 2,295,617 | Woolford | Sept. 15, 1942 |
| 2,305,655 | Woolford | Dec. 22, 1942 |
| 2,311,014 | Woolford | Feb. 16, 1943 |